United States Patent
Sonne

(10) Patent No.: US 12,428,953 B2
(45) Date of Patent: Sep. 30, 2025

(54) METHOD OF PREPARING A FIRST COMBINED DIGITAL SIGNAL TO BE TRANSMITTED ALONG A WIRELINE DEPLOYED IN A WELL, AND METHOD OF PREPARING AND TRANSMITTING TELEMETRY DATA ALONG A WIRELINE DEPLOYED IN A WELL

(71) Applicant: Altus Intervention (Technologies) AS, Stavanger (NO)

(72) Inventor: Darrell S. Sonne, Katy, TX (US)

(73) Assignee: Altus Intervention (Technologies) AS, Stavanger (NO)

( * ) Notice: Subject to any disclaimer, the term of this patent is extended or adjusted under 35 U.S.C. 154(b) by 0 days.

(21) Appl. No.: 18/715,863

(22) PCT Filed: Dec. 13, 2022

(86) PCT No.: PCT/NO2022/050307
§ 371 (c)(1),
(2) Date: Jun. 3, 2024

(87) PCT Pub. No.: WO2023/113610
PCT Pub. Date: Jun. 22, 2023

(65) Prior Publication Data
US 2025/0034993 A1    Jan. 30, 2025

(30) Foreign Application Priority Data
Dec. 15, 2021   (NO) .................................. 20211512

(51) Int. Cl.
*E21B 47/13*      (2012.01)
(52) U.S. Cl.
CPC .................................. *E21B 47/13* (2020.05)

(58) Field of Classification Search
CPC .......... E21B 47/13; E21B 47/12; H04B 1/38; H04B 3/54; G01V 1/40; G08C 15/00
See application file for complete search history.

(56) References Cited

U.S. PATENT DOCUMENTS

| | | |
|---|---|---|
| 3,991,611 A | 11/1976 | Marshall, III et al. |
| 4,583,093 A | 4/1986 | Beals |

(Continued)

FOREIGN PATENT DOCUMENTS

| | | |
|---|---|---|
| EP | 0398581 A2 | 11/1990 |
| WO | 149001 A1 | 7/2001 |

(Continued)

OTHER PUBLICATIONS

Freeman, "Fundamentals of Telecommunication", Ch. 6 pp. 112-119, Ch. 10 pp. 277-278, , Publisher: A Wiley-Interscience Publication; 1999.

(Continued)

*Primary Examiner* — Amine Benlagsir
(74) *Attorney, Agent, or Firm* — GableGotwals

(57) ABSTRACT

Disclosed is a method of preparing a first combined digital signal to be transmitted along a wireline deployed in a well. The first combined digital signal is for controlling a wireline conveying system and a measurement tool. The method includes converting a first telemetry signal to form a digitized telemetry signal, the first telemetry signal comprising control data for measurement tool; providing a control data for controlling the wireline conveying system; and transferring the digitized telemetry signal and the control data to a unit for processing data, the unit forming the first combined digital signal by multiplexing the transferred signal and data. Also disclosed is a method of preparing and transmitting telemetry data along a wireline, the method includes the previous steps and further: modulating the first combined (Continued)

digital signal to form a modulated signal; and transmitting the modulated signal from one end of the wireline to another.

17 Claims, 5 Drawing Sheets

(56) References Cited

U.S. PATENT DOCUMENTS

| | | | |
|---|---|---|---|
| 5,387,907 A | 2/1995 | Gardner et al. | |
| 6,252,518 B1* | 6/2001 | Laborde | E21B 47/12 |
| | | | 375/233 |
| 6,273,189 B1 | 8/2001 | Gissler et al. | |
| 2003/0010492 A1 | 1/2003 | Hill et al. | |
| 2005/0284663 A1 | 12/2005 | Hall et al. | |
| 2009/0005991 A1* | 1/2009 | Hurst | G01V 1/46 |
| | | | 702/6 |
| 2011/0025335 A1* | 2/2011 | Itskovich | G01V 3/24 |
| | | | 324/355 |
| 2011/0149684 A1* | 6/2011 | Hurst | G01V 1/46 |
| | | | 367/34 |
| 2012/0061143 A1* | 3/2012 | Hay | E21B 47/13 |
| | | | 340/854.3 |
| 2012/0268288 A1* | 10/2012 | Cousin | G01V 11/002 |
| | | | 340/855.8 |
| 2013/0206387 A1 | 8/2013 | Deville et al. | |
| 2013/0285830 A1 | 10/2013 | Hallundboek | |
| 2014/0196953 A1* | 7/2014 | Chitwood | E21B 7/068 |
| | | | 175/57 |
| 2015/0240627 A1* | 8/2015 | Gao | E21B 47/13 |
| | | | 324/700 |
| 2016/0084076 A1 | 3/2016 | Fanini et al. | |
| 2016/0258284 A1* | 9/2016 | Bittar | E21B 47/125 |
| 2020/0284141 A1* | 9/2020 | San Martin | E21B 17/042 |
| 2020/0408087 A1 | 12/2020 | Hagen | |
| 2021/0277774 A1* | 9/2021 | Parasram | H04L 63/062 |
| 2021/0373193 A1* | 12/2021 | Mamtimin | G01V 5/12 |
| 2021/0373194 A1* | 12/2021 | Mamtimin | G01V 5/12 |

FOREIGN PATENT DOCUMENTS

| | | |
|---|---|---|
| WO | 2004045107 A1 | 5/2004 |
| WO | 2015065930 A1 | 5/2015 |
| WO | 2020209830 A1 | 10/2020 |

OTHER PUBLICATIONS

The Circuit Connection, "https://www.youtube.com/watch?v=8i0GfugDBaw", , Publisher: youtube.

* cited by examiner

METHOD OF PREPARING A FIRST COMBINED DIGITAL SIGNAL TO BE TRANSMITTED ALONG A WIRELINE DEPLOYED IN A WELL, AND METHOD OF PREPARING AND TRANSMITTING TELEMETRY DATA ALONG A WIRELINE DEPLOYED IN A WELL

CROSS-REFERENCE TO RELATED APPLICATIONS

This United States application is the National Phase of PCT Application No. PCT/NO2022/050307 filed 13 Dec. 2022, which claims priority to Norwegian Patent Application No. 20211512 filed 15 Dec. 2021, each of which is incorporated herein by reference.

TECHNICAL FIELD

The present invention relates to a method of preparing a first combined digital signal to be transmitted along a wireline deployed in a well. Also, the present invention relates to a method of preparing and transmitting telemetry data along a wireline deployed in a well.

BACKGROUND

Wireline operations are among other things performed to collect subsurface information from wells, using various measurement apparatus. In many cases, especially if the well is highly deviated, a propulsion device may be used to help conveying the wireline and the measurement tools down the well. The collection of subsurface information is carried out by using measurement tools connected to the wireline. The measurements can be carried out while conveying down the well and/or pulling the wireline out of the well. When measuring, there is a need to communicate both control data and measurement data between surface equipment and the measurement tools.

Companies carrying out measurement services employ designated telemetry systems which transmit control data and measurement data during measurement. The telemetry systems typically communicate digital communication data between a surface telemetry unit and a downhole telemetry unit. The digital communication data is encoded by one of the telemetry units to form a bandwidth limited electric signal which is transferred via the wireline to the other telemetry unit. The receiving telemetry unit decodes the electric signal to recreate the original digital communication data. In most cases, different measurement companies use different telemetry systems.

In case a propulsion device is used to convey the wireline down the well, the conveyance service may be carried out by a company different from the company providing the measurement services.

The conveyance system used by the conveyance company normally comprises a propulsion device connected to the wireline, a surface power and control unit and a communication system comprising a telemetry system for communicating control data to and from the propulsion device.

The telemetry systems used by the measurement service company and the conveyance service company are normally incompatible. While the communication path can be changed from one telemetry system to the other, only one telemetry system can communicate at a time. Consequently, operators are forced to either communicate with the propulsion device or with the measurement tools. This is illustrated in the accompanying figures.

FIG. 1 shows a known setup for conveying a wireline 104 with measurement equipment attached thereto, down a well with use of a propulsion device 106, such as a wireline operated tractor. To control the propulsion device 106, a conveyance surface telemetry unit 103 is coupled to the wireline. A surface power unit 101 provides power through a DC power cable 102 coupled to the conveyance surface telemetry unit 103, which produces conveyance telemetry signals and combines them with the DC power. The combined DC power and telemetry signals are sent through the wireline 104 to the downhole conveyance telemetry unit 105.

Due to the incompatibility of the measurement telemetry system and the conveyance telemetry system, the measurement surface power supply and telemetry unit 107 shown in FIG. 1 is decoupled from the wireline. Furthermore, the figure shows a downhole measurement telemetry unit 108 which is either unpowered or disabled so it does not interfere with the conveyance telemetry systems.

Consequently, to perform downhole measurements, the conveyance surface telemetry unit 103 is known to be detached from the wireline as shown in FIG. 2. The figure further shows the measurement surface power supply and telemetry unit 107 being connected directly to the wireline 104 to provide power and control signals to the measurement tools 109. At the downhole end, the measurement telemetry unit 108 is connected and powered while the conveyance telemetry section 105 is unpowered or disabled. Measurement may now be carried out while pulling the wireline out of the well.

A known solution for simultaneous running of the propulsion device 106 and operation of the measurement tools 109 which does not require the telemetry systems to be compatible is known as logging while tractoring (LWT). The known setup is shown in FIG. 3, wherein an additional LWT surface adapter 130 is employed. The surface power unit 101, and the measurement surface power supply and telemetry unit 107 are now coupled to the LWT surface adapter 130, which combines the DC power from the surface power unit 101 with the telemetry signals from the measurement surface power supply and telemetry unit 107 and routes the combined power and telemetry onto the wireline 104. In the well, the DC power is fed to both the propulsion device 106 and the measurement tools 109, while the telemetry data is routed to the downhole measurement telemetry unit 108.

SUMMARY OF THE INVENTION

The invention will now be described and has for its object to remedy or to reduce at least one of the drawbacks of the prior art, or at least provide a useful alternative to prior art. The object is achieved through features, which are specified in the description below and in the claims that follow.

It has been realized that a problem with prior art occurs when two different telemetry systems are used, one for communicating measurement control data and another for communicating conveyance control data. During operation, one of the telemetry systems is detached from the wireline while the other system is operating.

An object of the present invention is to provide a solution for preparing one set of telemetry data for simultaneous transfer along with another set of telemetry data, even if the telemetry systems used are incompatible.

According to a first aspect of the present invention, there is provided a method of preparing a first combined digital signal to be transmitted along a wireline deployed in a well, wherein the first combined digital signal is for controlling a system for conveying the wireline through the well and for operating a measurement tool in the well. The method comprises the steps of:

converting a first telemetry signal to form a digitized telemetry signal, the first telemetry signal comprising control data for operating the measurement tool in the well;

providing a control data for controlling the system for conveying the wireline; and transferring the digitized telemetry signal and the control data to a unit for processing data, the unit forming the first combined digital signal by multiplexing the digitized telemetry signal with the control data.

The first telemetry signal may have been formed by encoding a digital control signal containing control data for operating measurement tools in a well. The encoding may comprise modulating the digital control signal. The digital control signal may comprise measurement data from measurement tools in a well.

The first telemetry signal may be prepared ready to be transferred directly to the wireline. The first telemetry signal may be an electric telemetry signal. The electric telemetry signal may be sent on an analogue telemetry cable. The electric telemetry signal may be an analogue signal. The first telemetry signal may be a light signal received via a fibre-optic cable. The first telemetry signal may comprise a modulated carrier signal. The first telemetry signal may comprise an electric carrier signal modulated by one or more of frequency modulation, amplitude modulation and phase modulation, or a combination of the three. The first telemetry signal may be a light signal prepared to be transmitted on a fibre-optic cable.

The unit for processing data may be integrated in a surface telemetry communication unit. The unit for processing data may be a program integrated in the surface telemetry communication unit. The unit may be a separate unit coupled to the surface telemetry communication unit.

The first combined digital signal may be formed by using a packet addressing technique.

The transferring step may be carried out by using fibre-optic cables. The transferring step may comprise wireless transmission. The control data for controlling the system for conveying the wireline may be generated by the same unit that multiplexes the control data with the digitized telemetry signal.

Optionally, the digitized telemetry signal is formed by decoding the first telemetry signal. The decoding may involve recreating an original digital control signal.

Optionally, the digitized telemetry signal is formed by demodulating the first telemetry signal. The demodulation may involve recreating an original digital control signal. The demodulation may involve using an inverse modulation technique to recreate an original digital control signal.

The original digital control signal may comprise control data for operating measurement tools in a well. The original digital control signal may comprise measurement data from measurement tools in a well.

Optionally, the digitized telemetry signal is formed by sampling the first telemetry signal. The sampling may involve converting an analogue electric signal to a digital electric signal. The sampling may be carried out with an analogue to digital converter (ADC). The digitized telemetry signal may be in a different format than the original digital control signal.

Optionally, the first telemetry signal has been separated from an analogue electric signal comprising an AC part and a DC part, the AC part comprising the first telemetry signal, and the DC part comprising a DC power signal which is blocked from entering the converting means.

According to a second aspect of the invention, there is provided a method of preparing and transmitting telemetry data along a wireline deployed in a well. The method comprises the steps of:

carrying out the method steps as described in the first aspect of the invention;

modulating the first combined digital signal to form a modulated signal; and transmitting the modulated signal from one end of the wireline to another end of the wireline.

The modulated signal may be an electric signal. The electric signal may comprise an AC part. The modulation may comprise amplitude modulation, frequency modulation, phase modulation or a combination of the three. The modulation may be carried out by use of a separate modem. The modulation may be carried out by use of an integrated telemetry unit providing communication data for operating a downhole propulsion device. The propulsion device may comprise a wireline operated tractor.

The method may comprise the step of encoding the first combined digital signal to form an encoded signal. The encoding may be using alternate mark inversion (AMI). The encoding may comprise using a Manchester code. The encoded signal may be an electric telemetry signal. The encoded signal may be a light signal prepared for transmission along a fibre-optic cable.

The method may comprise the step of transmitting the encoded AC signal from one end of the wireline to an other end of the wireline.

The transmission may be by use of one or more electric cables or fibre optic cables integrated in the wireline.

Optionally, DC power is transmitted along with the modulated signal.

Optionally, the method further comprises the step of routing the DC power to power a propulsion device and to power measurement tools.

Optionally, the method further comprises the step of changing the DC voltage level such that voltage delivered to the measurement tools is substantially different than the voltage received on the wireline.

Optionally, the method further comprises the step of demodulating the modulated signal, to form a second combined digital signal having a similar characteristic to the first combined digital signal.

Optionally, the method further comprises the step of splitting the second combined digital signal to form a first recreated digital signal and a second recreated digital signal, the first recreated digital signal and the second recreated digital signal having a similar characteristic to the digitized signal and the conveyance control data, respectively.

Optionally, the method further comprises the steps of transferring the second recreated digital signal to a propulsion device and using the second recreated digital signal to control the propulsion device.

Optionally, the method further comprises the step of converting the first recreated digital signal to form a second telemetry signal having a similar characteristic to the first telemetry signal and to transfer the second telemetry signal to a downhole measurement telemetry unit.

DRAWINGS AND DESCRIPTION

There will now be described, by way of example only, embodiments of the invention, with reference to the accompanying drawings, FIGS. 1-3 illustrating known prior art, in which.

In telemetry communication, the communication between the surface and subsurface equipment is often bidirectional. Command and control information is typically sent from the surface to the subsurface equipment. Status and measurement information is typically sent from the subsurface equipment to the surface. In the following, when one path is described in detail, the other path is implied to also be present. Its implementation is similar to the path described, although mirrored. Communication along a wireline may be by way of a monocable, a multiline or a fibre-optic cable.

Figure 1:
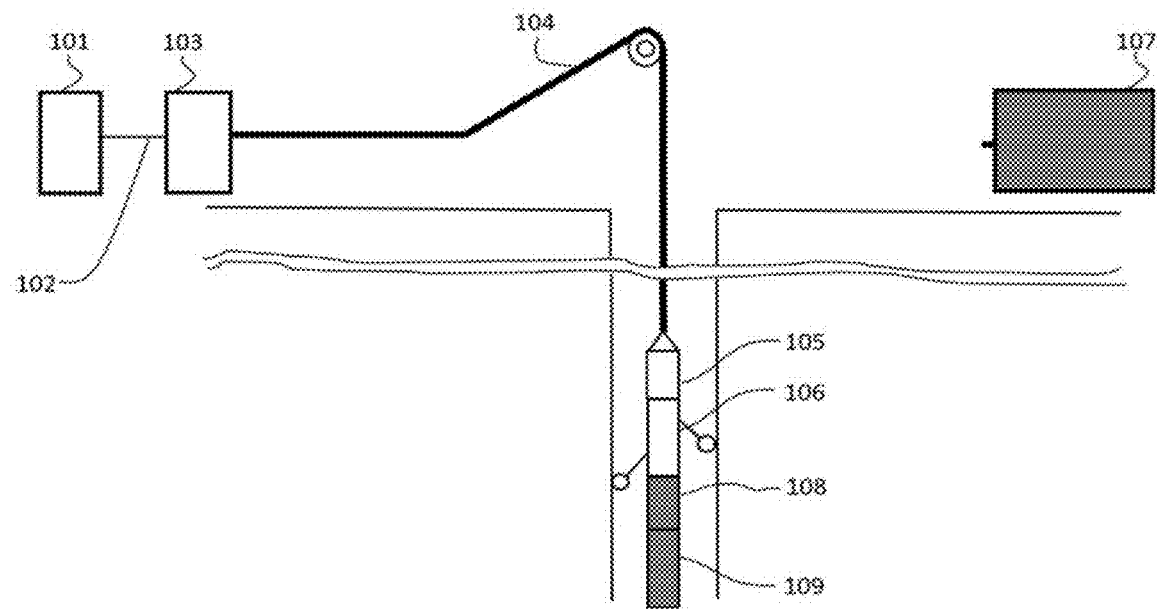
FIG. 1 illustrates a known setup in which only the conveyance telemetry system is coupled to the wireline.
Figure 2:
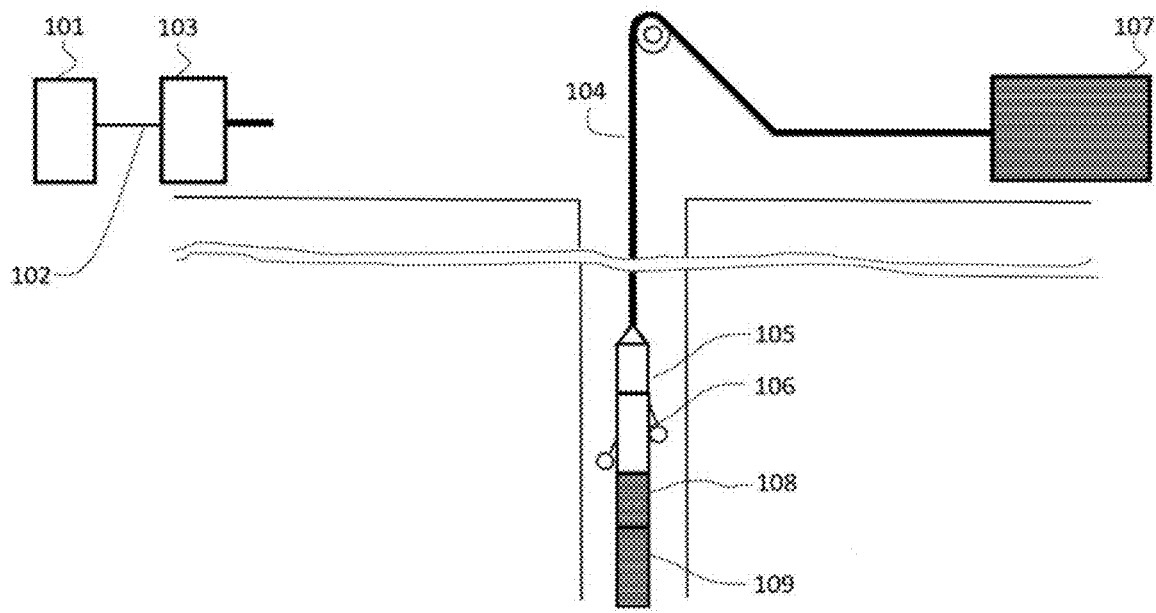
FIG. 2 illustrates a known setup in which only the measurement telemetry system is coupled to the wireline.
Figure 3:
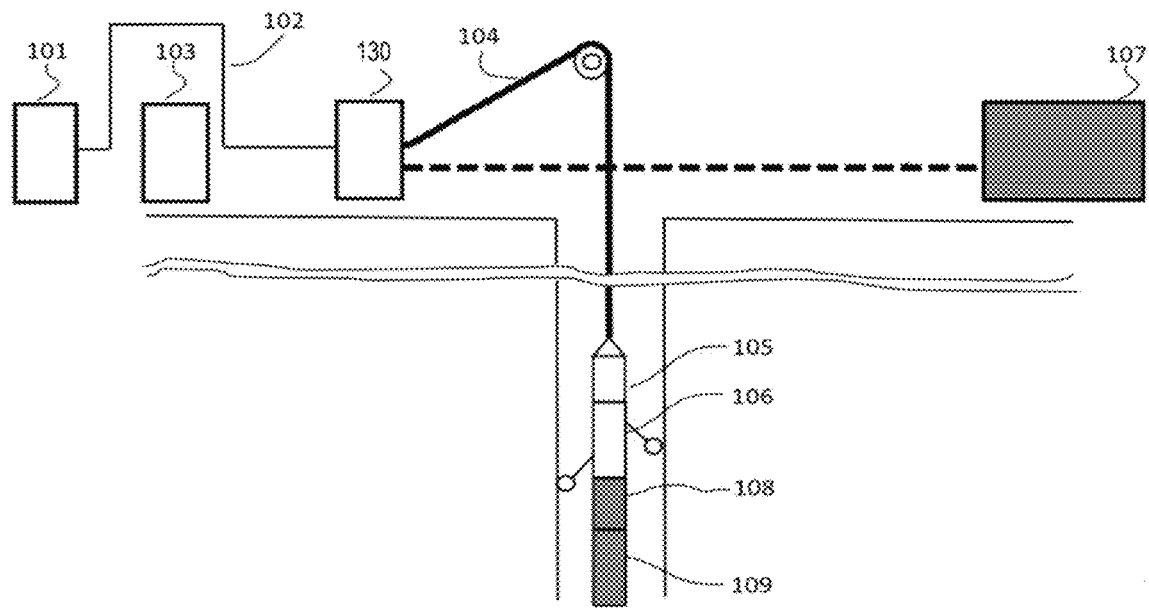
FIG. 3 illustrates a known setup in which the measurement telemetry system is coupled to the wireline, while the propulsion device is powered but not controlled.
Figure 4:
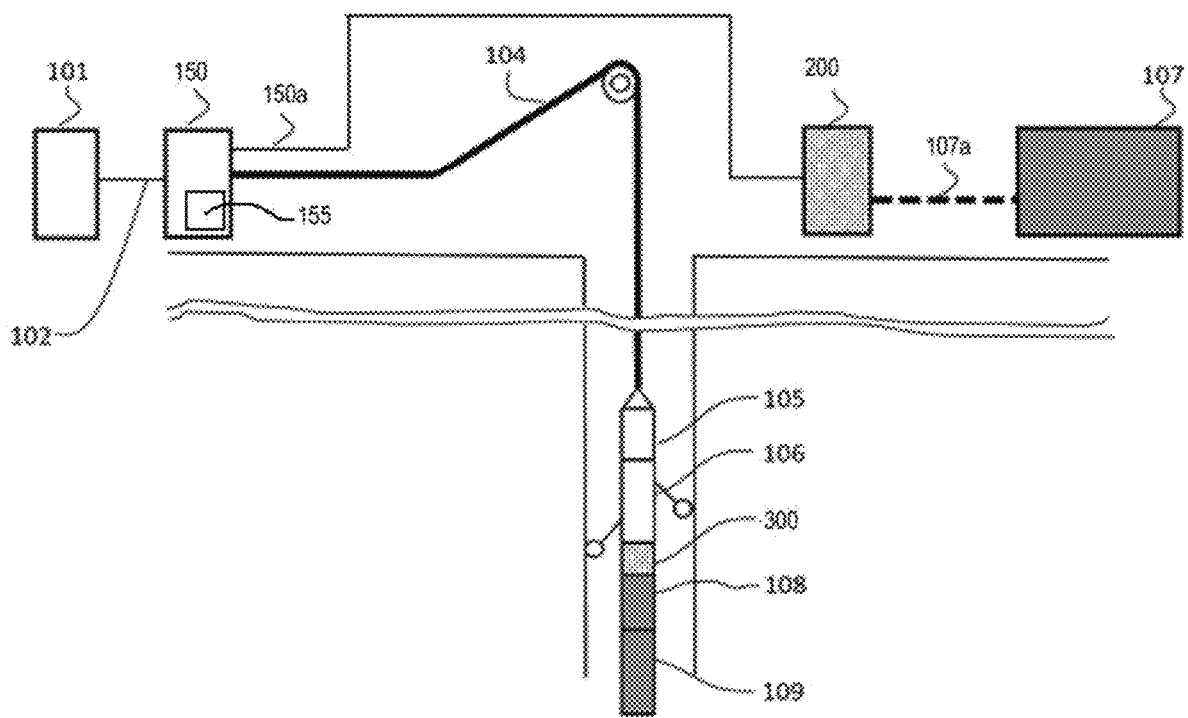
FIG. 4 illustrates a setup where both the measurement tools and the propulsion device can be run and controlled simultaneously.

In one example, as shown in FIG. 4, a measurement surface power supply and telemetry unit 107 is employed and arranged to communicate data and DC power to downhole measurement tools 109 via the wireline 104. In the present invention, the measurement surface power supply and telemetry unit 107 is connected to a converting means via an electric cable 107a. In the example shown in the figures, the converting means is a surface telemetry interface 200. The measurement surface power supply and telemetry unit 107 provides an analogue electric signal comprising a DC power signal and a first telemetry signal. The DC power signal, which comprises power for running the measurement tools 109, is blocked by the surface telemetry interface 200.

The first telemetry signal is an encoded signal containing control data for operating measurement tools 109 in the well. The first telemetry signal is typically formed from a digital communication signal by an encoding method involving amplitude modulation, frequency modulation, phase modulation or a combination of the three. The first telemetry signal may also be formed by other encoding method such as alternate mark inversion (AMI) or Manchester code. The surface telemetry interface 200 digitizes the first telemetry signal to form a digitized telemetry signal. The method used for digitization may vary, depending on the shape of the encoded signal to be digitized. Further details on both the different digitization techniques and the construction and function of surface telemetry interface 200 can be found in the description related to FIG. 5 below.

Referring again to FIG. 4, the digitized telemetry signal is transferred to a unit for processing data 155 via a digital telemetry cable 150a. In the figures, the unit for processing data 155 is shown as an integrated part of the surface telemetry communication unit 150. The surface telemetry communication unit 150 comprises means for controlling the propulsion device 106. The surface telemetry communication unit 150 further receives DC power from a surface power unit 101 through a DC power cable 102. The surface telemetry communication unit 150 produces conveyance control data and combines these with the digitized telemetry signal to form a first combined digital signal. The combination is carried out by the unit for processing data 155. The unit for processing data 155 may use different combination methods, depending on the format of the digitized telemetry signal. The data can be combined by using a multiplexing method, i.e., combining two digital signal streams into one. Two common multiplexing methods are time division multiplexing and packet address-based messaging. More details on when to use the different methods follows the description of FIG. 5 below.

The first combined digital signal is now modulated to form a modulated electric signal. The modulation method may comprise frequency modulation, amplitude modulation, phase modulation or a combination of the three. The surface telemetry communication unit 150 further transmits the modulated electric signal together with the DC power, down a well via the wireline 104. The DC power and the modulated electric signal is received by a downhole conveyance telemetry unit 105. The DC power is sent to the propulsion device 106 and to the downhole measurement telemetry unit 108 via a DC cable 308 shown in FIG. 6. Referring again to FIG. 4, the downhole conveyance telemetry unit 105 demodulates the modulated electric signal to recreate the first combined digital signal. The downhole conveyance telemetry unit 105 further splits the first combined digital signal to recreate the conveyance control data and the digitized telemetry signal. The conveyance control data is used to operate the propulsion device 106, while the recreated digitized telemetry signal is sent on a digital cable 105a to a downhole telemetry interface 300 which converts the recreated digitized telemetry signal to recreate the first telemetry signal. The recreated first telemetry signal is then sent to the measurement telemetry unit 108, where it is decoded, to obtain the control data for operating the measurement tools 109.

Communication data and measurement data to be sent from the measurement tools 109 to the surface are sent as telemetry data from the downhole measurement telemetry unit 108. These telemetry data are received by the downhole conveyance telemetry unit 105 which sends the telemetry data in a manner similar to the method described in the example above. In the latter case, both the downhole telemetry interface 300 and the surface telemetry interface 200 change roles, and the downhole conveyance telemetry unit 105 and the surface telemetry communication unit 150 change roles.

Figure 5:
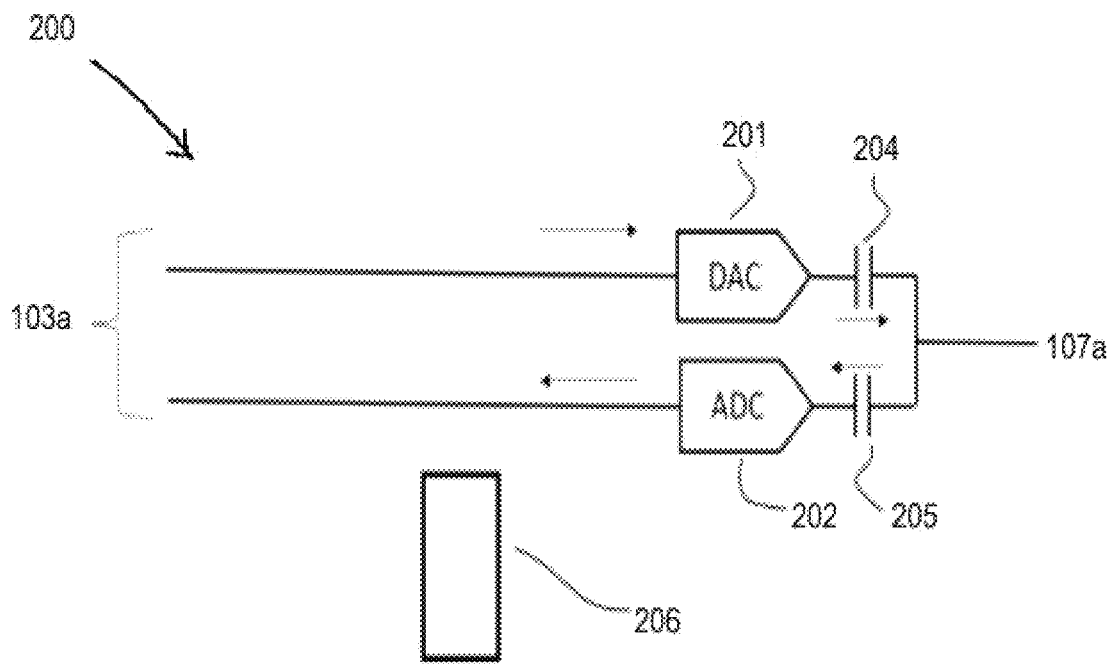
FIG. 5 is a schematic overview of the components of a surface telemetry interface.

FIG. 5 illustrates the surface telemetry interface 200 comprising a digital to analogue converter, DAC 201, an analogue to digital converter, ADC 202, two DC power blocks 204 and 205 and a processor 206. The surface telemetry interface 200 is connected to the surface telemetry communication unit 150 via digital cables 150a, and to the measurement surface power supply and telemetry unit 107 via an electric cable 107a. The DC power blocks 204 and 205 may comprise analogue bandpass or highpass filters. The processor 206 provides timing and wave shaping information to the DAC 201 and the ADC 202. Processor 206, DAC 201, and ADC 202 are generalized blocks that represent the steps needed to perform encoding, decoding, modulation or demodulation.

In use, the surface telemetry interface 200 receives an analogue electric signal from the measurement surface power supply and telemetry unit 107 via the cable 107a. The signal comprises an AC part and a DC part and is routed to the power block 205, which blocks the DC part of the signal from entering the ADC 202, while allowing the AC part to pass through to the ADC 202. The ADC 202 converts the signal to a digital signal which is sent to the surface telemetry communication unit 150 via the digital telemetry cable 150a. The AC part of the signal comprises the AC telemetry signal to be sent to the downhole measurement telemetry unit 108. The AC telemetry signal has been formed by encoding a digital telemetry signal containing the measurement telemetry data. The AC telemetry signal is also termed the first telemetry signal.

In a first scenario, the encoding method comprises a well-known modulation or encoding technique. In this scenario, the conversion to a digital telemetry may be carried out by the surface telemetry interface 200 inverse modulating or decoding the AC telemetry signal, to recreate the original digital telemetry signal.

In a second scenario, a decoding of the AC telemetry signal is not possible or not desirable. This might be because the AC telemetry signal has been formed by some unknown encoding technique. In this scenario, the surface telemetry interface 200 digitizes the AC telemetry signal by using a sampling technique.

In both scenarios, the surface telemetry interface 200 converts the AC telemetry signal to form a digitized signal. The term digitized signal is used in the specification to indicate that the digital signal is formed from another signal, in this case, the AC telemetry signal. The digitized signal is now routed onto the digital telemetry cable 150a as a bit stream.

Referring to the description of how the surface telemetry communication unit 150 functions, the digitized telemetry signal may be combined with the conveyance control data by different methods. In the first scenario described above, the digitized telemetry signal might be in well-known format, such that the message content can be extracted. In this case the digitized telemetry signal can be converted to a format compatible with the conveyance company's system. This makes it possible to read and display the conveyance control data with the surface telemetry communication unit 150. The data may be integrated with the conveyance control data to form the first combined digital signal.

In other cases, even though encoding can be performed, the digitized telemetry signal is in an unknown format, or the measurement company is unwilling to share their communication data. In both this case, the surface telemetry communication unit 150 forms the first combined digital signal by using a multiplexing method to combine the digitized telemetry signal with the conveyance control data. Multiplexing is also used in the second scenario where the digitized telemetry signal is formed by a sampling technique.

The surface telemetry interface 200 also receives communication data from the well. These data are received as a digital signal containing analogue telemetry data sent from the downhole measurement telemetry unit 108. The digital signal enters the surface telemetry interface 200 via the digital telemetry cable 150a. The digital signal is routed to the DAC 201 which converts the signal to an analogue electric signal. The analogue electric signal is similar to the analogue telemetry data sent from the downhole measurement telemetry unit 108. The analogue electric signal then passes through the power block 204 and is sent to the measurement surface power supply and telemetry unit 107 via the analogue electric cable 107a.

Figure 6:
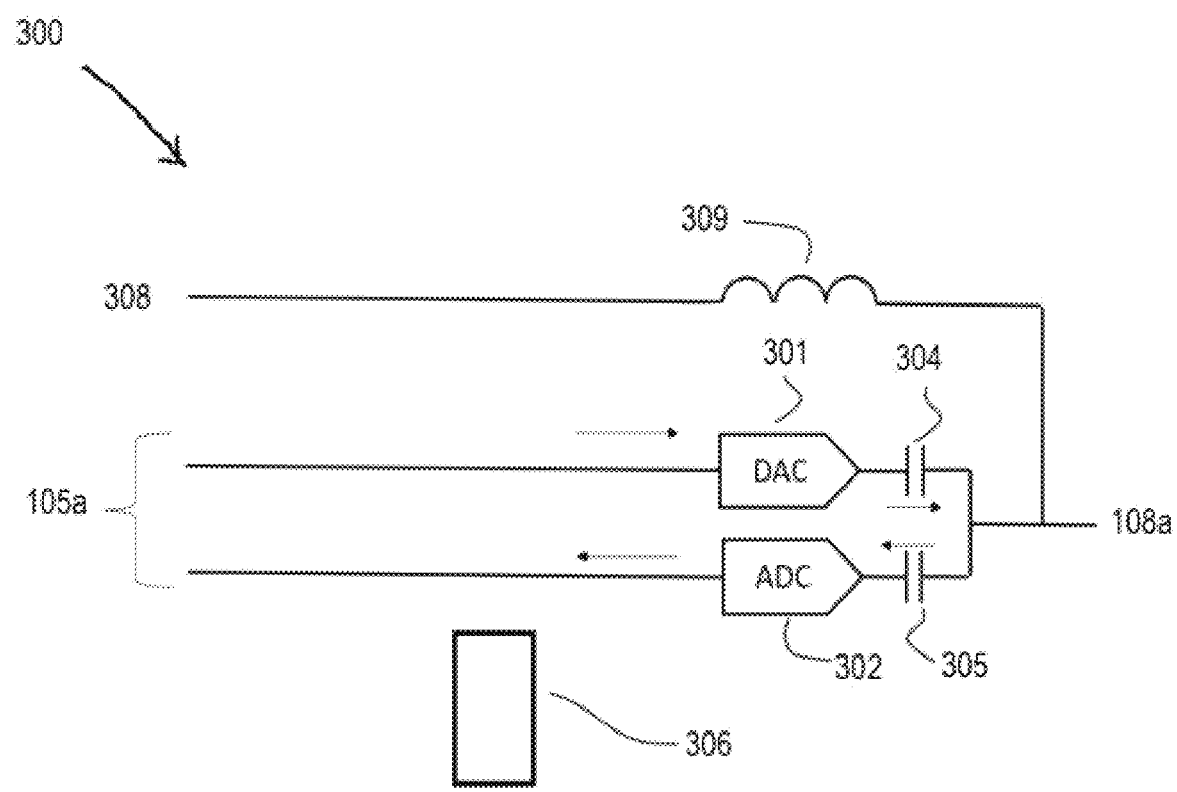
FIG. 6 is a schematic overview of the components of a downhole telemetry interface.

FIG. 6 illustrates the downhole telemetry interface 300 comprising a digital to analogue converter, DAC 301, an analogue to digital converter, ADC 302, two DC power blocks 304 and 305 and a processor 306. The downhole telemetry interface 300 is connected to the downhole conveyance telemetry unit 105 via digital cables 105a, and to the downhole measurement telemetry unit 108 via an electric cable 108a. The DC power blocks 304 and 305 may comprise analogue bandpass or highpass filters. The processor 306 provides timing and wave shaping information to the DAC 301 and the ADC 302. Processor 306, DAC 301, and ADC 302 are generalized blocks that represent the steps needed to perform encoding, decoding, modulation, and/or demodulation. The power block 304 is responsible for preventing DC voltage from appearing at the DAC 301 through analogue cable 108a. The DC power block 305 is responsible for preventing the DC voltage present on analogue cable 108a from appearing at ADC 302.

In use, the downhole telemetry interface 300 receives the recreated digitized telemetry from the downhole conveyance telemetry unit 105 on the digital cable 105a. The DAC 301 converts the digitized telemetry signal to form an analogue electric signal similar to the original telemetry signal that was received by the ADC 202 shown in FIG. 5. The conversion technique is the inverse of the conversion technique used by the ADC 202. The analogue electric signal contains the communication data sent from the measurement surface power supply and telemetry unit 107. The analogue electric signal then passes through the power block 304 and is routed to the analogue electric cable 108a. DC power from the downhole conveyance telemetry unit 105 appears on the DC cable 308 which is connected to the analogue electric cable 108a via a telemetry block 309. The telemetry block 309 prevents uplink and downlink telemetry energy from getting to the wrong place. In the downlink direction, the telemetry block 309 prevents devices connected to DC cable 308, such as the propulsion device 106, from distorting the signal entering the downhole measurement telemetry unit 108. In the uplink direction, telemetry block 309 prevents the downhole measurement telemetry unit 108, which is connected to analogue electric cable 108a, from reaching downhole conveyance telemetry unit 105 and distorting the signal at wireline 104.

The downhole telemetry interface 300 also receives communication data and measurement data to be sent to the measurement surface power supply and telemetry unit 107. These data are received on the analogue electric cable 108a as an analogue signal from the downhole measurement telemetry unit 108. The analogue signal enters the downhole telemetry interface 300 via the analogue electric cable 108a and is routed to the ADC 302. The ADC 302 converts the telemetry signal to a digital signal. The digital signal contains the information to be sent to the measurement surface power supply and telemetry unit 107. The digital signal is sent along the digital cable 105a to the downhole conveyance telemetry unit 105.

Figure 7:
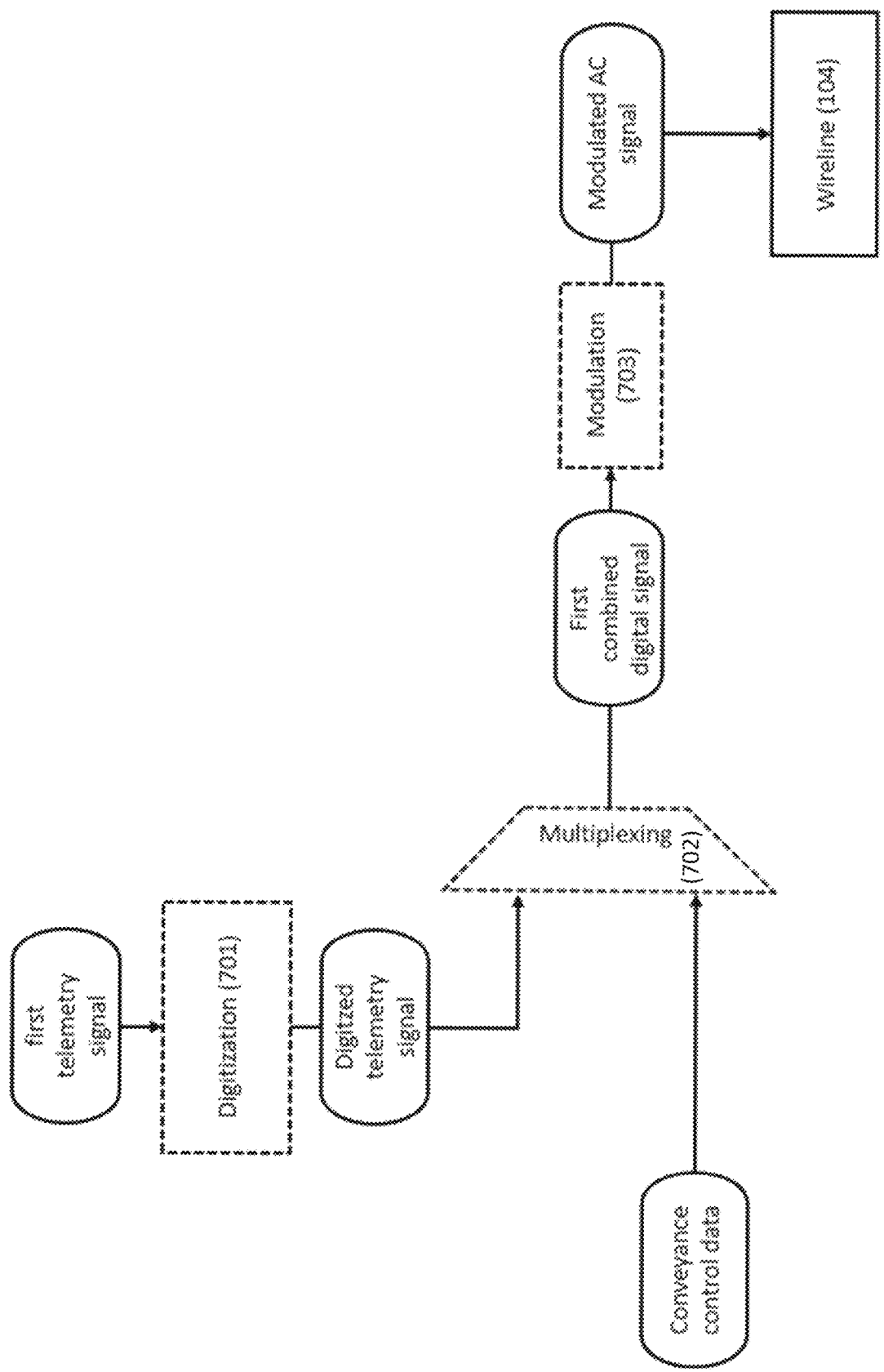
FIG. 7 is a block diagram of the steps performed to prepare telemetry data at one end of a wireline, for transmission to the other end of the wireline.

In FIG. 7 there is shown a method embodiment for preparing telemetry data for transmission along a wireline. The method comprises the following steps:

701: Receiving and digitizing an AC telemetry signal to form a digitized telemetry signal. The AC telemetry signal comprising the measurement telemetry data to be transmitted.

702: Multiplexing the digitized telemetry signal with a second digital signal comprising conveyance control data to form a first combined digital signal

703: Modulating the first combined digital signal to form a modulated electric signal The modulated electric signal is routed onto the wireline 104. For downlink data, i.e., data sent from the surface down the well, the modulated electric signal is combined with DC power before being routed onto the wireline 104.

Figure 8:
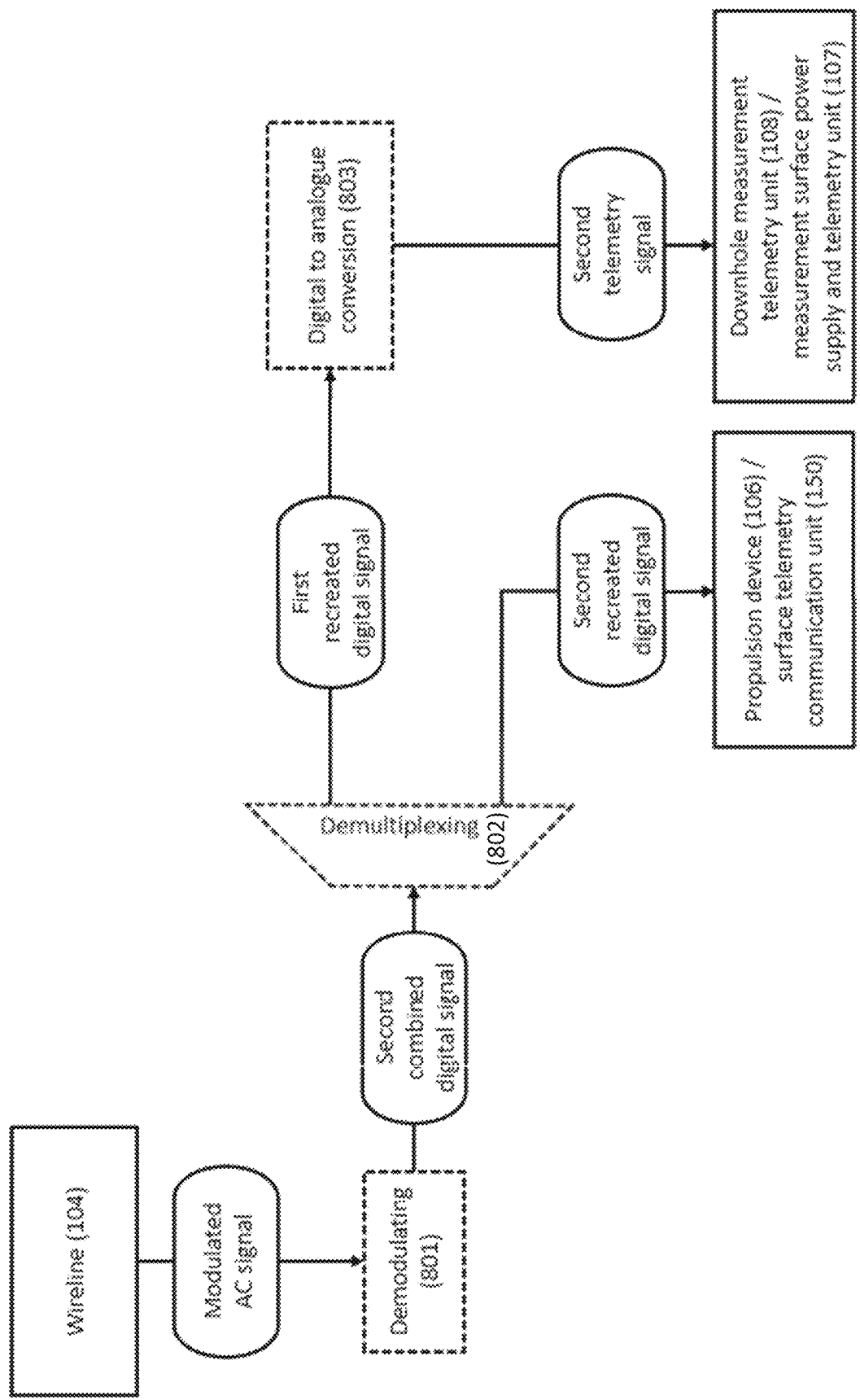
FIG. 8 is a block diagram of the steps performed to receive and process telemetry data at the other end of the wireline.

In FIG. 8 there is shown a method embodiment for receiving and processing telemetry data transmitted along a wireline. The method comprises the following steps:

801: Receiving and demodulating a modulated electric signal to form a second combined digital signal.

802: Demultiplexing the second combined digital signal to form a first recreated digital signal and a second recreated digital signal. The first recreated digital signal being similar to the digitized telemetry signal in FIG. 7. The second recreated digital signal being similar to the conveyance control data shown in FIG. 7.

803: Converting the first recreated digital signal to form a second telemetry signal. The second telemetry signal being similar to the AC telemetry shown in FIG. 7.

For downlink signals, the AC telemetry signal is routed to the downhole measurement telemetry unit 108 and the second recreated digital signal to the propulsion device 106. For uplink signals, the AC telemetry signal is routed to the downhole measurement telemetry unit 108 and the second recreated digital signal to the propulsion device 106.

Although not shown, for downlink data, DC power is typically received together with the modulated electric signal. In this case, the first method step involved is extracting the DC power from the combined signal received from the wireline 104. DC power is sent to the propulsion device 106. Furthermore, for downlink data, the second telemetry signal is combined with DC power before being sent to the downhole measurement telemetry unit 108. The combined signal is similar to the analogue electric signal that was sent from the measurement surface power supply and telemetry unit 107. A power converter may also be used, which allows the DC voltage level sent on the wireline to be substantially different from the DC voltage level sent to measurement telemetry unit 108.

The methods shown in FIGS. 7 and 8 may be used to simultaneously send measurement communication data and conveyance telemetry data either from the surface down the well or from the well and up to the surface.

If the digitized telemetry signal has been decoded, as described in the first scenario above, and the signal can be formatted to a format compatible with the conveyance company's system, step 702 of multiplexing may be omitted, and the data can be integrated with the conveyance data.

When in the description a signal is said to be similar to another signal or have a similar characteristic to another signal, it should be understood that the process is designed for making a signal as similar as possible to the other signal. However, no such process is perfect, resulting in the signal being slightly different from the other signal, but still preserving the main information that was contained within the signal. Similarly, the term recreate should be read as creating a new signal similar to the original signal, even though the recreated signal is not perfectly similar to its origin.

With AC and DC, it is meant alternating current and direct current, respectively.

The distinction between digital signals and analogue signal or AC signal does not refer to the information content of the signals, but to the way in which the digital information content is contained within the signals. With a digital signal, the bit streams i.e., the sequence of zeros and ones are normally transmitted by altering the voltage between a low and a high value, to form discrete voltage values. With the terms analogue signal or AC signal, the bit stream is contained within an electric signal where the voltage varies in a continuous manner to form a wavelike variation of the current. By e.g., altering the frequency of the current variation (frequency modulation) or the amplitude of the voltage variation (amplitude modulation), it is possible to make a distinction between a zero and a one.

By being able to communicate both measurement communication data and conveyance control data simultaneously, the power to the propulsion unit can be adjusted based on real time video from look ahead cameras mounted on the drill string. Furthermore, measurement may be performed of undisturbed downhole fluid flow patterns while conveying down with use of the propulsion device. The invention also helps distinguishing whether a drop in propulsion speed comes from wireline drag which would be reflected in increased readings from an upper tension sub or from tool drag on the tool in front of the propulsion device which would be reflected in increased readings from a lower tension sub. Same applies to identify tractor slow down due to a wheel spinning out, or locking up in a side pocket mandrel, or going over a sudden change in geometry. Data acquisition may also be more effective and/or rigorous, since measurements can be carried out both conveying down and up the well.

Another benefit of the invention is that measurement companies employing telemetry systems that functions poorly on long cables or during LWT, may still transfer the measurement telemetry data along with the conveyance telemetry data using the conveyance company's telemetry system instead. The conveyance telemetry systems are often more robust to the noise created by the propulsion unit, since it must function while the propulsion unit is operating.

Yet another benefit of the invention is that a company supplying both conveyance and measurement tools is able to run additional 3rd party measurement tools even if the 3rd party tool uses a different telemetry system.

Hence, the invention disclosed provides a method for simultaneous use of two incompatible telemetry systems, allowing both the measurement service company and the conveyance service company to run their tools as if they were the only company communicating telemetry data via the wireline.

The invention claimed is:

1. A method of preparing a first combined digital signal to be transmitted along a wireline deployed in a well, wherein the first combined digital signal is for controlling a system for conveying the wireline through the well and for operating a measurement tool in the well, the method comprising steps of:

providing a surface telemetry interface for converting an analog electric signal to a digital signal;

converting, by the surface telemetry interface, a first telemetry signal to form a digitized telemetry signal, the first telemetry signal comprising control data for operating the measurement tool in the well;

providing the control data for controlling the system for conveying the wireline;

providing a unit for processing data; and transferring the digitized telemetry signal and the control data to the unit for processing the data, the unit forming the first combined digital signal by multiplexing the digitized telemetry signal with the control data.

2. A method according to claim 1, wherein the digitized telemetry signal is formed by decoding the first telemetry signal.

3. A method according to claim 1, wherein the digitized telemetry signal is formed by demodulating the first telemetry signal.

4. A method according to claim 1, wherein the digitized telemetry signal is formed by sampling the first telemetry signal.

5. A method according to claim 1, wherein the first telemetry signal has been separated from the analog electric signal comprising an alternating current (AC) part and a direct current (DC) part, the AC part comprising the first telemetry signal, and the DC part comprising a DC power signal which is blocked from entering the surface telemetry interface.

6. A method of preparing and transmitting telemetry data along a wireline deployed in a well, the method comprising steps of:

providing a surface telemetry interface for converting an analog electric signal to a digital signal;

converting, by the surface telemetry interface, a first telemetry signal to form a digitized telemetry signal, the first telemetry signal comprising control data for operating measurement tools in the well;

providing the control data for controlling a system for conveying the wireline;

providing a unit for processing the telemetry data;

transferring the digitized telemetry signal and the control data to the unit for processing the telemetry data, the unit forming a first combined digital signal by multiplexing the digitized telemetry signal with the control data;

modulating the first combined digital signal to form a modulated signal; and transmitting the modulated signal from one end of the wireline to another end of the wireline.

7. A method according to claim 6, wherein a direct current (DC) power is transmitted along with the modulated signal.

8. A method according to claim 7, further comprising, routing the DC power to power a propulsion device and to power the measurement tools.

9. A method according to claim 8, further comprising, changing a DC voltage level such that voltage delivered to the measurement tools is substantially different than the voltage received on the wireline.

10. A method according to claim 6, further comprising, demodulating the modulated signal, to form a second combined digital signal having a similar characteristic to the first combined digital signal.

11. A method according to claim 10, further comprising, splitting the second combined digital signal to form a first recreated digital signal and a second recreated digital signal, the first recreated digital signal and the second recreated digital signal having a similar characteristic to the digitized telemetry signal and the control data, respectively.

12. A method according to claim 11, further comprising, transferring the second recreated digital signal to a propulsion device and using the second recreated digital signal to control the propulsion device.

13. A method according to claim 11, further comprising, converting the first recreated digital signal to form a second telemetry signal having a similar characteristic to the first telemetry signal and to transfer the second telemetry signal to a downhole measurement telemetry unit.

14. A method according to claim 6, wherein the digitized telemetry signal is formed by decoding the first telemetry signal.

15. A method according to claim 6, wherein the digitized telemetry signal is formed by demodulating the first telemetry signal.

16. A method according to claim 6, wherein the digitized telemetry signal is formed by sampling the first telemetry signal.

17. A method according to claim 6, wherein the first telemetry signal has been separated from the analog electric signal comprising an alternating current (AC) part and a direct current (DC) part, the AC part comprising the first telemetry signal, and the DC part comprising a DC power signal which is blocked from entering the surface telemetry interface.

* * * * *